ABSTRACT OF THE DISCLOSURE

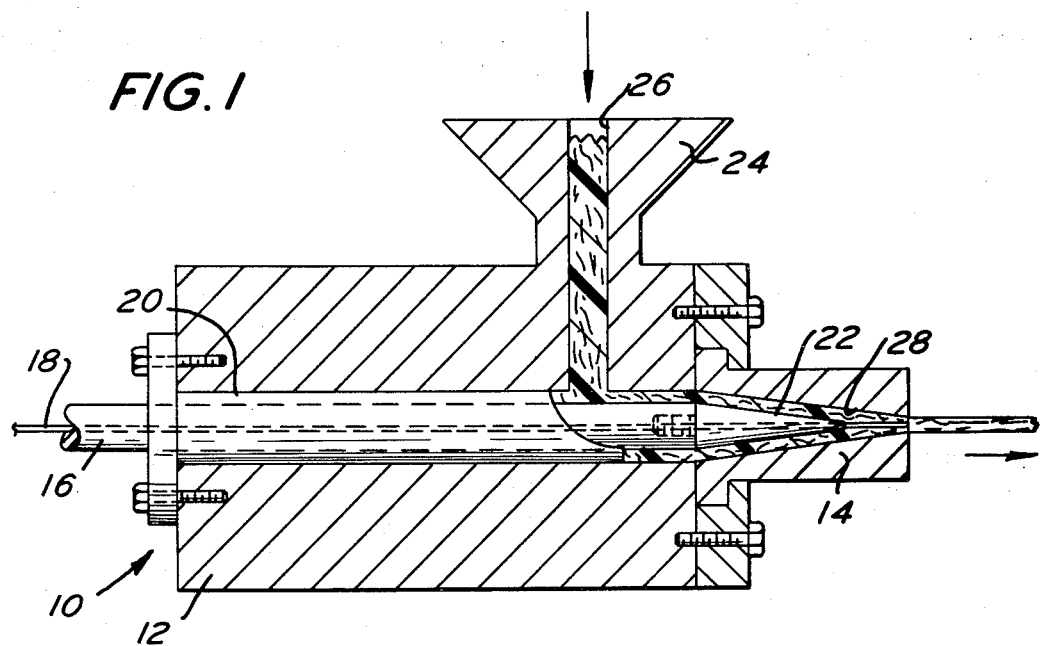
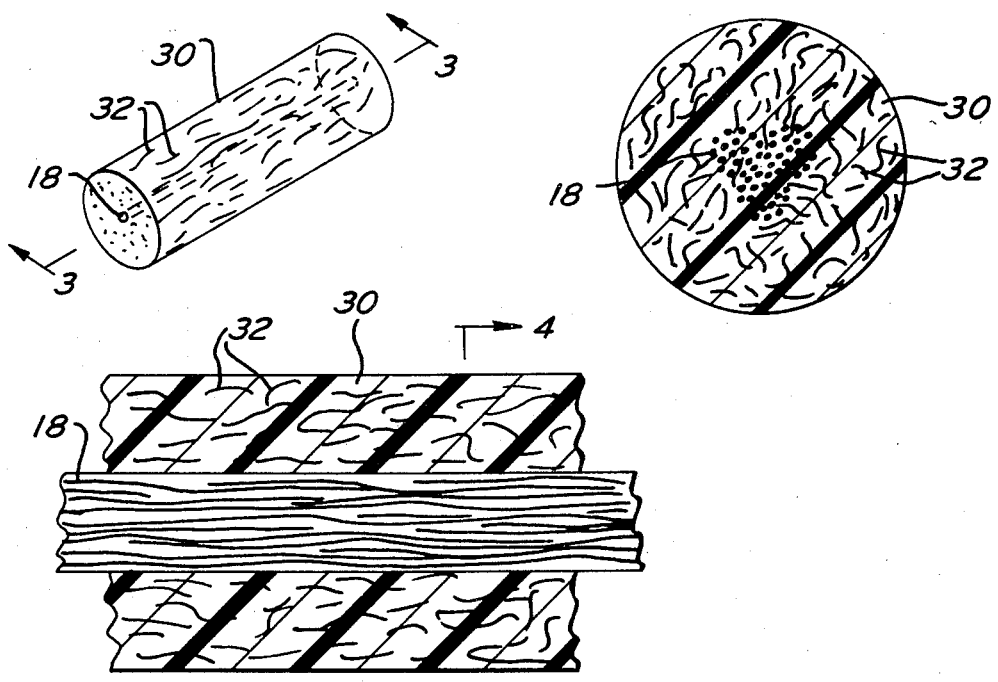

Process for production of molding compositions containing high weight percentage of glass comprising feeding an extruded mixture of glass fibers and molten thermoplastic resin to a cross-head die, coating continuous glass roving with said mixture in said cross-head die, solidifying said molten thermoplastic while said thermoplastic is coated on said roving, and pelletizing the same into pellets containing between about 61 to 90 weight percent glass. The molding composition is in the form of such pellets which generally comprise right cylinders having a diameter of between 3/32 and 1/4 inch and a height of between 1/8 to 1/2 inch.

---

This application is a division of copending application Ser. No. 833,983 filed June 17, 1969, and entitled: "Process for Production of Molding Compositions Containing High Weight Percentage of Glass and Such Molding Compositions," now Pat. No. 3,608,033.

The present invention is directed to a process for the production of molding compositions containing a high weight percentage of glass, and such molding compositions, and in particular to molding compositions containing in excess of about 60 weight percent of glass, such as between 61 to 90 weight percent of glass.

Glass-reinforced thermoplastic injection molding compound has achieved widespread adoption. Conventionally, such material is sold in the form of cylindrical pellets containing glass fibers and/or roving disposed therein.

There has been a long-felt need for suitable glass-reinforced thermoplastic injection molding pellets containing a high weight percentage of glass. Thus, it is most desirable from a cost standpoint for the molder making the glass-reinforced article to be able to blend thermoplastic with glass-reinforced thermoplastic material so as to achieve the desired weight percentage of glass in the molded article. Thus, it is significantly cheaper to blend four pellets of thermoplastic with a single pellet of glass-reinforced thermoplastic (with each of the pellets being of the same size), said glass-reinforced thermoplastic containing 80 weight percent glass, to yield a molded article containing 16 weight percent glass, than it is to use five pellets, each of which contains 16 weight percent glass. The use of a single pellet containing 80 weight percent glass means that only one pellet out of five used by the molder need be glass-reinforced. Since there is a significant processing charge to forming glass-reinforced pellets, this charge is substantially reduced when the number of glass-reinforced pellets used by the molder is substantially reduced. However, problems have been encountered in the usage of extruded thermoplastic injection molding pellets derived from roving (by "roving" is meant a plurality of glass fibers joined together in a strand), which pellets contain very high concentrations of glass, such as of the order of 61 to 90 weight percent with thermoplastic pellets in injection molding. The usage of such pellets together with thermoplastic pellets result in "fuzz-balling" from the break-up of the continuous roving during the initial mixing prior to injection molding. Such fuzz-balling results in an increase in the bulk density of the product, and makes the product difficult to handle.

Another approach that has resulted in an inferior product has been to coat a continuous roving of glass with a solution of the thermoplastic, and then to volatilize the solvent from the solution to yield a thin coating of the thermoplastic on the roving. The resulting material has not been altogether satisfactory because the extreme thinness of the thermoplastic coating renders it subject to breakage, peeling, and other mechanical destruction.

This invention has as an object the provision of a process for the production of molding compositions containing a high weight percentage of glass such as about 61 to 90 weight percent glass.

This invention has as another object the provision of a process for the production of molding compositions containing a high weight percentage of glass, which can be tumbled or otherwise mechanically blended by agitation with thermoplastic particles, with the resulting blend being used to mold a glass-reinforced article.

This invention has as yet another object the provision of glass-reinforced thermoplastic injection molding pellets containing a high weight percentage of glass.

Other objects will appear hereinafter.

These and other objects are accomplished by the process of my invention in which an extruded mixture of glass fibers and molten thermoplastic resin is fed to a cross-head die. A continuous glass roving is introduced through the cross-head die and coated with said mixture of glass fibers and molten thermoplastic. The so-coated roving is removed from the cross-head die, with the thermoplastic being solidified by cooling, and the product then cut into pellets, such as right cylinders having a diameter of between 3/32 inch and 1/4 inch, and a height of 1/8 inch to 1/2 inch.

The glass-reinforced molding compositions of the present invention comprise right cylinders having a diameter of between 3/32 inch to 1/4 inch and a height of 1/8 inch to 1/2 inch. Such cylinders have a longitudinal axial core of continuous glass roving coated with a mixture of glass fibers and thermoplastic and containing from about 61 to 90 weight percent of glass.

For the purpose of illustrating the invention, there is shown in the drawings a form which is presently preferred; it being understood, however, that this invention is not limited to the precise arrangements and instrumentalities shown.

Referring to the drawings wherein like reference characters refer to like parts;

FIG. 1 is a longitudinal sectional view of a cross-head die used in conjunction with the process of the present invention.

FIG. 2 is a perspective view of a glass-reinforced thermoplastic injection molding pellet of the present invention.

FIG. 3 is a longitudinal sectional view of the product from the cross-head die shown in FIG. 1, after such product has left the forming die, taken on line 3—3 of FIG. 2.

FIG. 4 is a cross-sectional view taken on line 4—4 on FIG. 3.

Referring to the drawings, and initially to FIG. 1:

The cross-head die is designated generally as 10. It includes a die body 12 and a forming die 14. A mandrel 16 is disposed within the bore of the body 12 and the forming die 14. The mandrel 16 is provided with a bore through which the continuous roving 18 extends. Such continuous roving 18 may be fed from a feeder roll (not shown) or other source. The mandrel 16 includes a deflector sleeve 20 and a tip 22, with the tip 22 extending within the bore of the forming die portion 14 of the cross-head die 10.

The die body 12 includes an inlet 24 which is in communication with the discharge of an extruder (not shown). The extruder discharges molten thermoplastic containing dispersed glass fibers into the bore 26 of the inlet 24 of die body 12. The die body 12 may include heating means (not shown) for maintaining the thermoplastic in the molten state. However, in many cases, the thermoplastic will have been heated to such a degree that it will remain molten within the cross-head die without the need for heating means and the cross-head die.

The bore 26 is in communication with the bore 28 within which the mandrel 16 and its tip 22 are disposed.

The deflector sleeve 20 of the mandrel 16 prevents molten thermoplastic and glass fibers from entering the posterior portion of the die body 12 (shown in the left portion of FIG. 1).

The continuous roving 18 is guided within the bore of the mandrel 16 and emerges from the tip 22 of the mandrel 16 into the bore 28 of the forming die 14.

Within the bore 28 such continuous roving from the tip 22 becomes coated with the molten thermoplastic containing dispersed glass fibers and the so-coated roving is removed from the forming die 14. This removal may be accomplished by a take-up roll (not shown) or by pinch roll means, such as pinch roll means (not shown) associated with a chopper which cuts the so-coated continuous roving into right cylinders of the desired length. The feed roll, take-up roll, chopper, ad pinch roll means are conventional equipment presently used in conjunction with the manufacture of cylinders of thermoplastic injection molding polymers.

FIG. 3 is a longitudinal section showing the coated continuous roving as the same exists when it leaves the forming die 14.

The continuous roving 18 may be formed from one or more strands of continuous roving. Preferably, the continuous roving should have a length of between about 400 to 4000 feet per pound of roving. The roving should be Type E glass, preferably in diameters running from 0.0002 to 0.0006 inch. Normally, either G glass fibers having a diameter of 0.00037 inch or K fibers having a diameter of 0.00051 inch may be used.

A wide variety of suitable sizings are available, and the selection of a sizing forms no part of the present invention. The sizings vary depending upon the specific thermoplastic that is used. By way of example, a suitable commercial sizing may be a three-component system and include a silane, such as aminosilane or an epoxysilane as a chemical bonding agent; a lubricant to prevent chafing (namely to prevent the degradation of glass fibers by mechanical contact with each other); and a cementitious material such as polyvinyl alcohol or other commercial water-soluble film former.

As seen in FIGS. 3 and 4, the continuous roving 18 is surrounded by a coating of the thermoplastic polymer 30 containing dispersed glass fibers 32.

The solidification of the molten thermoplastic portion 30 of the coating for the continuous roving 18 is readily accomplished by cooling in air after the same has left the forming die 14.

As seen particularly in FIG. 4, the thermoplastic portion 30 occupies the voids and spaces about the continuous roving 18. The glass fibers 32 in the thermoplastic 30 are dispersed substantially randomly in the coating.

The feed to the extruder in advance of the cross-head die may include either a mixture of glass fibers (such as chopped rovings) and thermoplastic pellets, or thermoplastic pellets containing dispersed glass fibers therewithin.

Since the combined polymer dispersed glass coating, which embraces the roving, is stiff and harder than conventional polymer coatings, the pellets containing a high percentage of glass do not break apart upon tumbling to produce fuzz balls. Moreover, the glass fibers dispersed within the thermoplastic coating are not subject to fuzz-balling.

FIG. 2 reveals a perspective view of a pellet of the present invention. As seen in FIG. 2, such pellet is a right cylinder. The right cylinder should have a diameter of between $3/32$ inch to $1/4$ inch and a height of $1/8$ inch to $1/2$ inch. Such size pellets may be satisfactorily handled in commercial molding equipment.

As heretofore indicated, a plurality of continuous rovings may be used as the core. In the illustrated embodiment, three such rovings are utilized.

The subject invention is applicable to all thermoplastics which may be used to manufacture glass-reinforced injection molded articles. By way of example, the same include the nylon polyamides, such as nylon 6, nylon 11, nylon 610, nylon 66, etc.; polystyrene and copolymers thereof such as styrene-acrylonitrile and ABS; polyolefins such as polyethylene, polypropylene, and polyisobutylene; polyarylates such as polycarbonates, polysulfones and polyphenylene oxide; acetals, polyurethanes, and polyvinylchloride.

By way of example, and not by way of limitation, the following examples serve to illustrate the subject invention:

EXAMPLE 1

Glass fortified polystyrene pellets containing 20 weight percent dispersed glass fibers designated CF–1004, whose physical properties are detailed in Liquid Nitrogen Processing Corporation Product Data Bulletin, 2080–1067 were extruded through a 2-inch Royle extruder into the cross-head shown in FIG. 1 onto continuous roving, designated PPG 539. Such continuous roving was formed of K fiber and was fed as two strands through a 0.125 inch die which resulted in a strand weighing 2.74 grams per foot running at 500 feet per minute. The resultant product contained 61 weight percent glass. During the run, the extruder was operated at a barrel temperature of between 500 to 550° F., and heaters were maintained in the cross-head die so that such die was at a similar temperature. The extruder was operated at eight revolutions per minute.

EXAMPLE 2

The process of Example 1 may be repeated, but with polystyrene pellets and chopped roving (PPG 539) being fed to the extruder.

EXAMPLE 3

SAN resin containing 30% uniformly dispersed glass fibers were extruded using the cross-head die over 22 strands of continuous K fiber glass roving weighing 0.094 gram per foot. The result was a product containing 2.10 grams of continuous glass strands, 0.38 gram glass fibers dispersed in 0.88 gram of SAN resin.

EXAMPLE 4

A type 6 nylon resin containing 40% uniformly dispersed glass fibers suitably treated for reinforcing nylon were extruded over 30 strands of continuous glass fiber roving weighing 0.089 gram per foot. The product weighed 3.95 grams per foot so that the product contained 0.77 gram of type 6 nylon, 1.51 grams of uniformly dispersed glass fibers and 2.67 grams of chopped continuous glass roving.

EXAMPLE 5

An 8–10 melt index polypropylene homopolymer containing 30% glass fibers treated so as to interact with the polypropylene were extruded convergent with glass fibers (suitably treated for compatibility with polypropylene) weighing 0.045 gram per linear foot. Forty-eight continuous roving strands were used so that the total product weight was 3.08 grams per foot. The resin/dispersed glass coating weighed 0.92 gram per foot and contained 0.28 gram uniformly dispersed glass fiber per foot. The total glass fiber content was 79 percent.

The present invention may be embodied in other specific forms without departing from the spirit or essential attributes thereof.

I claim:

1. A glass reinforced injection molding pellet consisting essentially of a right cylinder having a height of ⅛ inch to ½ inch and a diameter of 3/32 inch to ¼ inch, said cylinder having a longitudinal axial core of continuous glass roving coated with a mixture of dispersed glass fibers in a thermoplastic, with said cylinder containing from about 61 to 90 weight percent glass.

References Cited
UNITED STATES PATENTS

| | | | |
|---|---|---|---|
| 2,730,455 | 1/1956 | Swann | 117—4 |
| 2,877,501 | 3/1959 | Bradt | 161—176 X |
| 2,940,885 | 6/1960 | Burke | 161—176 |

WILLIAM A. POWELL, Primary Examiner

U.S. Cl. X.R.

117—4, 126; 156—244, 269, 279; 161—141, 143, 170